United States Patent [19]

Carroll

[11] Patent Number: 4,554,306

[45] Date of Patent: Nov. 19, 1985

[54] POLYMER-MODIFIED POLYOLS

[75] Inventor: William G. Carroll, Vossem, Belgium

[73] Assignee: Imperial Chemical Industries PLC, London, England

[21] Appl. No.: 618,347

[22] Filed: Jun. 7, 1984

[30] Foreign Application Priority Data

Jun. 27, 1983 [GB] United Kingdom ............... 8317354

[51] Int. Cl.$^4$ ..................... C08G 83/00; C08K 5/06; C08L 75/08; C08L 75/12
[52] U.S. Cl. ................................ 524/377; 524/507; 525/131; 521/137
[58] Field of Search ............... 524/507, 377; 525/131, 525/137

[56] References Cited

U.S. PATENT DOCUMENTS

| 4,298,511 | 11/1981 | Schimmel ........................ 524/507 |
| 4,438,252 | 3/1984 | Carroll et al. | |
| 4,452,923 | 6/1984 | Carroll ........................... 521/167 |

FOREIGN PATENT DOCUMENTS

| 1393243 | 5/1975 | United Kingdom . |
| 2072204 | 9/1981 | United Kingdom . |
| 2102822 | 2/1983 | United Kingdom . |
| 2102824 | 2/1983 | United Kingdom . |
| 2102825 | 2/1983 | United Kingdom . |

*Primary Examiner*—C. Warren Ivy
*Attorney, Agent, or Firm*—Cushman, Darby & Cushman

[57] ABSTRACT

Polymer-modified polyols of reduced viscosity are made by reacting an organic polyisocyanate with a low molecular weight hydroxyl-containing compound in a polyol in the presence of a specified dispersant. The dispersant, which is of a type known for dispersing pigments in paints, is obtained by reacting (1) a copolymer comprising units derived from the following ethylenically unsaturated monomers in the stated proportions by weight based on the total weight of the copolymer:
   (a) 0–50% of a hydroxy group-containing monomer, and/or
   (b) 0–20% of an amide group-containing monomer, provided that there is always present at least 5% of (a) and (b);
   (c) 20–80% of a monomer free from carboxyl groups and containing a straight or branched chain alkyl group of from 7 to 22 carbon atoms, and
   (d) 0–50% of one or more monomers free from the hydroxy, amide and $C_{7-22}$ alkyl groups present in (a), (b) or (c), and also, as an essential constituent,
   (e) up to 20% of a monomer containing an epoxide group, the total of monomers (a), (b), (c), (d) and (e) being 100%, with
(2) a compound bearing a carboxyl group and a group having pigment dispersant characteristics. Preferably it is a copolymer of styrene; 2-ethyl hexyl acrylate; hydroxy isopropylmethacrylate; methacrylamide; glycidyl methacrylate in the ratios 26:40:25:5:4, modified by esterification with p-aminobenzoic acid in the presence of dimethyl dodecyl tertiary amine.

The modified polyols of particular interest are those used in the manufacture of flexible foam slabstock.

8 Claims, No Drawings

POLYMER-MODIFIED POLYOLS

This invention relates to polymer-modified polyols useful in the manufacture of polyurethane products.

UK Patent Specification No. 2072204A describes a method of forming a polymer-modified polyol in which an olamine is polymerised with an organic polyisocyanate in the presence of a polyol. The olamine is defined as an organic compound having one or more hydroxyl (-OH) groups and also one or more amine groups. Alkanolamines are mentioned as being suitable olamines and triethanolamine is one alkanolamine exemplified. The organic polyisocyanate and polyol may be any such compounds conventionally used for forming polyurethanes and polyether polyols are specifically mentioned. The polymer-modified polyol is particularly useful as the polyol component in the manufacture of flexible polyurethane foams.

UK Patent Specifications Nos. 2102822, 2102824 and 2102825 describe similar polymer-modified polyols using a particular oxyalkylated triethanolamine as the olamine, polyesters as the polyol component and a particular diphenylmethane diisocyanate as the polyisocyanate component. In addition, U.S. Pat. Nos. 4,438,252 and 4,452,923 describe, in the first case, related polymer-modified polyols in which a polyethylene glycol having a molecular weight up to 600 or another nitrogen-free polyol having a molecular weight of less than 250 are used instead of the olamine and, in the second case, high-strength polymer-modified polyols.

The present invention is concerned with improving the physical properties, in particular lowering the viscosity, of the polymer-modified polyols described in these patent publications to facilitate their use in the preparation of polyurethane products.

According to one aspect of the present invention there is provided a polymer-modified polyol comprising a dispersion in a polyol having a molecular weight of at least 1000, of the reaction product of an organic polyisocyanate and a compound having a molecular weight of up to 600 and containing at least one hydroxyl group, the dispersion containing a dispersant which is the product obtained by reacting (1) a copolymer comprising units derived from the following ethylenically unsaturated monomers in the stated proportions by weight based on the total weight of the copolymer:
  (a) 0–50% of a hydroxy group-containing monomer, and/or
  (b) 0–20% of an amide group-containing monomer, provided that there is always present at least 5% of (a) and (b);
  (c) 20–80% of a monomer free from carboxyl groups and containing a straight or branched chain alkyl group of from 7 to 22 carbon atoms, and
  (d) 0–50% of one or more monomers free from the hydroxy, amide and C$_{7-22}$ alkyl groups present in (a), (b) or (c), and also, as an essential constituent,
  (e) up to 20% of a monomer containing an epoxide group, the total of monomers (a), (b), (c), (d) and (e) being 100%, with (2) a compound bearing a carboxyl group and a group having pigment dispersant characteristics.

The polyol, polyisocyanate and low molecular weight hydroxyl-containing compound used in the invention may be any such ingredients described in the patent publications referred to hereinbefore, whose contents are imported, by reference, into the present specification. The components of the reaction product, i.e. the polyisocyanate and low molecular weight polyol, will normally be chosen to give a concentration of reaction product in the polymer-modified polyol of from 1 to 80% based on the combined weights of the reaction product and polyol and an isocyanate (NCO):-hydroxyl group (OH) ratio of from 0.33:1 to 1.5:1. The precise amounts of ingredients used will depend on their nature and the polymer-modified polyol required and may be selected by reference to the present publications referred to.

Of particular interest are polymer-modified polyols made from polyether polyols used in the manufacture of flexible foam slabstock, especially polyoxpropylene polyols obtained by reacting a propylene oxide with an active hydrogen-containing initiator, and from an olamine, especially triethanolamine, or a polyethylene glycol having a molecular weight of up to 600.

By the term "olamine" is meant an organic compound having one or more hydroxyl groups and also one or more primary, secondary or tertiary amine groups. Having two or more active hydrogen atoms, the olamine can react polyfunctionally with the polyisocyanate to form a poly-addition product. Where the olamine is a primary or secondary amine it has hydroxyl and amine groups with active hydrogen atoms which may be reactive towards the isocyanate groups of the polyisocyanate. Where it is a tertiary amine it has two or more hydroxyl groups with active hydrogen atoms all of which may be reactive towards the isocyanate groups of the polyisocyanate. In each case all or some of the reactive hydrogen atoms may, in fact, react with isocyanate groups.

Polymer-modified polyols of low viscosity are fairly easily made with ethylene oxide tipped polyoxypropylene polyols which are used to make highly resilient foams. However, polymer-modified polyols made with conventional flexible foam slabstock polyols, which are polyoxypropylene polyols having little ethylene oxide tipping, tend to be of high viscosity sometimes forming coarse solid pastes. It is to these latter polymer-modified polyols that the invention has particular application.

The dispersant used in the invention is of a type known to be suitable for use as a pigment dispersant in making paints and is described in British Patent Specification No. 1,393,243 as follows: The dispersant is the product of reacting (1) a copolymer comprising units derived from the following ethylenically unsaturated monomers in the stated proportions by weight based on the total weight of the copolymer:
  (a) 0–50% of a hydroxy group-containing monomer and/or
  (b) 0–20% of an amide group containing monomer, provided that there is always present at least 5% of (a) or (b);
  (c) 20–80% of a monomer free from carboxyl groups and containing a straight or branched chain alkyl group of from 7 to 22 carbon atoms, and
  (d) 0–50% of one or more monomers free from the hydroxy, amide or C$_{7-22}$ alkyl groups present in (a), (b) or (c), and also as an essential constituent,
  (e) up to 20% of a monomer containing an epoxide group, the total monomers (a), (b), (c), (d) and (e) being 100%, with (2) a compound bearing a carboxyl group and a group having pigment dispersant characteristics.

Particularly suitable pigment dispersant groups which can be introduced into the dispersant in the above-described way are those obtained by reacting the epoxide groups present in the copolymer with a compound of the structure

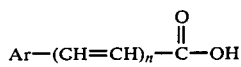
$$Ar-(CH=CH)_n-\overset{O}{\underset{\|}{C}}-OH$$

wherein Ar is an aromatic group and n is 1 or 0, in the presence of a tertiary amine. The group Ar is preferably phenyl and may contain a wide range of substituents, such as nitro and amino groups; examples of suitable compounds include p-amino benzoic acid and p-nitro benzoic acid. Preferably the dispersant is a copolymer of styrene; 2-ethyl hexyl acrylate; hydroxy isopropylmethacrylate; methacrylamide; glycidyl methacrylate in the ratios 26:40:25:5:4, modified by esterification with p-aminobenzoic acid in the presence of dimethyl dodecyl tertiary amine. Any amount of dispersant may be used which lowers the viscosity of the polymer-modified polyol. Suitably, from 0.5 to 5.0% by weight of dispersant on the polyol component are used and typically from 1 to 3% by weight.

According to another aspect of the present invention there is provided a process for preparing a polymer-modified polyol which comprises reacting an organic polyisocyanate with a compound having a molecular weight of up to 600 and containing at least one hydroxyl group, in a polyol which has a molecular weight of at least 1000, in the presence of a dispersant as hereinbefore defined.

The process is conveniently carried out by blending the dispersant with the polyol and one of the two reactants, i.e. the low molecular weight hydroxyl-containing compound or organic polyisocyanate, preferably the former, and adding the other reactant with vigorous agitation to the blended ingredients. The process may be a batch process or continuous in-line blending process in which the polyol with blended dispersant and two reactants are pumped at controlled rates and blended simultaneously or one reactant mixed firstly with the polyol followed by addition and mixing of the other reactant. The invention is of particular value where mixing of the ingredients is slow or inefficient, for instance in a continuous in-line blending process, and, without the dispersant present, would otherwise lead to a more viscous product.

The invention also includes the use of the polymer-modified polyols herein described in the preparation of polyurethane products and the products so obtained.

The invention is illustrated by the following Examples in which all parts and percentages are by weight unless otherwise stated.

EXAMPLE 1

12.54 Parts of tolylene diisocyanate (80:20 mix of 2,4/2,6 isomers) were added with vigorous agitation to a blend of 80 parts of a random oxyethylated/oxypropylated glycerol polyether (containing about 9% ethylene oxide units) having a molecular weight of 3500, 7.46 parts of triethanolamine (98% pure) and 1.0 part of a dispersant which is a copolymer of styrene; 2-ethyl hexyl acrylate; hydroxy isopropyl methacrylate; methacrylamide and glycidyl methacrylate in the ratios 26:40:25:5:4, modified by esterification with p-aminobenzoic acid in the presence of dimethyl dodecyl tertiary amine.

The amount of TDI used was sufficient to provide 0.66 isocyanate groups for each hydroxyl group provided by the triethanolamine.

A good dispersion was obtained having a viscosity of 30 ps.

By comparison, a polymer-modified polyol made in the same way but without the dispersant, gave a coarse, solid paste.

EXAMPLE 2

Example 1 was repeated except that 13.2 parts of a uretonimine modified pure diphenylmethane diisocyanate (MDI) was used instead of the tolylene diisocyanate and 6.80 instead of 7.46 parts of the triethanolamine were used to maintain the isocyanate/hydroxy group ratio.

A coarse dispersion was obtained having a viscosity of 177 ps.

By comparison, a polymer-modified polyol made in the same way but without the dispersant, gave a coarse, thick paste.

EXAMPLE 3

Example 2 was repeated except that 80 parts of an oxypropylated glycerol polyether (MW 3000) were used instead of the 80 parts of oxyethylated/oxypropylated glycerol polyether; 10.20 parts of polyethylene glycol (MW 200) were used instead of the 6.80 parts of triethanolamine and 9.80 instead of the 13.2 parts of the modified MDI were used to maintain the isocyanate/hydroxyl group ratio.

A good dispersion was obtained having a viscosity of 190 ps.

By comparison, a polymer-modified polyol made in the same way but without the dispersant, gave a not very opaque dispersion having a thick skin and thick bottom layer.

EXAMPLE 4

Example 2 was repeated except that 80 parts of an oxypropylated glycerol polyether tipped with 16% ethylene oxide (MW 6000) were used instead of the 80 parts of oxyethylated/oxy- propylated glycerol polyether and 2.0 instead of 1.0 parts of the dispersant were used.

A good dispersion was obtained having a viscosity of 180 ps.

By comparison, a polymer-modified polyol made in the same way but without the dispersant, gave a good dispersion having a viscosity of 700 ps.

Other conventional dispersing agents, such as diethyl ethylene diamine with ethylene and propylene oxide chains and its dimethyl sulphate salt and polymers from hexane diol and tolylene diisocyanate with a propylene oxide or methoxy polypropylene glycol chain, which were used to make polymer-modified polyols from ingredients similar to those used in Examples 1 to 4, had no apparent effect.

We claim:

1. A polymer-modified polyol comprising a dispersion in a polyol having a molecular weight of at least 1000, of from 1 to 80% by weight based on said polymerpolyol of the in-situ reaction product of an organic polyisocyanate and a compound having a molecular weight of up to 600 and containing at least one hydroxyl group, in an NCO:OH ratio of from 0.33:1 to 1.5:1, said reaction product being obtained in a reaction between said organic polyisocyanate and said compound in the presence of from 0.5 to 5% of a dispersant which is the product obtained by reacting
(1) a copolymer comprising units derived from the following ethylenically unsaturated monomers in the stated proportions by weight based on the total weight of the copolymer:
  (a) 0–50% of a hydroxy group-containing monomer,
  (b) 0–20% of a carboxamide group-containing monomer, provided that there is always present at least 5% of (a) or at least 5% of (b);
  (c) 20–80% of an alkene, alkyl acrylate or alkyl methacrylate free from carboxyl groups and containing a straight or branched chain alkyl group of from 7 to 22 carbon atoms, and
  (d) 0–50% of one or more monomers free from the hydroxy, carboxamide and $C_{7-22}$ groups present in (a), (b) or (c), and also, as an essential constituent,
  (e) up to 20% of a monomer containing an epoxide group, the total of monomers (a), (b), (c), (d) and (e) being 100%, with
(2) a compound of structure $Ar-(CH=CH)_n-CO_2H$ where Ar is an aromatic group and n is 1 or 0, in the presence of a tertiary amine.

2. A polymer-modified polyol according to claim 1 in which the polyol is a polyether polyol and the compound having a molecular weight of up to 600 is an olamine.

3. A polymer-modified polyol according to claim 1 in which the polyol is a polyether polyol and the compound having a molecular weight of up to 600 is a polyethylene glycol.

4. A polymer-modified polyol according to claim 2 in which the olamine is triethanolamine.

5. A polymer-modified polyol according to claim 1 in which the polyol is a polyoxypropylene polyol.

6. A polymer-modified polyol according to claim 1 in which the dispersant is a copolymer of styrene; 2-ethylhexyl acrylate; hydroxyisopropylmethacrylate; methacrylamide; glycidyl methacrylate in the ratios 26:40:25:5:4, modified by esterification with p-aminobenzoic acid in the presence of dimethyl dodecyl tertiary amine.

7. A polymer-modified polyol according to claim 1 in which the amount of dispersant used is from 0.5 to 5.0% by weight of the polyol.

8. A process for preparing a polymer-modified polyol which comprises reacting an organic polyisocyanate with a compound having a molecular weight of up to 600 and containing at least one hydroxyl group, in a polyol which has a molecular weight of at least 1000, in the presence of a dispersant as defined in claim 1.

* * * * *